(12) United States Patent
Cheng et al.

(10) Patent No.: US 7,966,710 B2
(45) Date of Patent: Jun. 28, 2011

(54) COOKWARE ARTICLE WITH SUBSTANTIALLY FLUSH RIVETS

(75) Inventors: Stanley Kin Sui Cheng, Vallejo, CA (US); Mang Hung Chan, Sriracha (TH); Tanveer Khan, Sriracha (TH)

(73) Assignee: Meyer Intellectual Properties Limited (VG)

( * ) Notice: Subject to any disclaimer, the term of this patent is extended or adjusted under 35 U.S.C. 154(b) by 1048 days.

(21) Appl. No.: 11/763,243

(22) Filed: Jun. 14, 2007

(65) Prior Publication Data

US 2008/0308562 A1   Dec. 18, 2008

(51) Int. Cl.
*B23P 11/00* (2006.01)
*B65D 25/10* (2006.01)

(52) U.S. Cl. ........... 29/525.01; 29/525.05; 29/525.06; 29/524.1; 220/768; 220/769

(58) Field of Classification Search .......... 29/525.01, 29/525.05, 525.06, 525.11, 525.13, 524.1, 29/509; 220/768, 769, 573.1, 573.2; 411/500, 411/501, 504, 506
See application file for complete search history.

(56) References Cited

U.S. PATENT DOCUMENTS

| | | | | |
|---|---|---|---|---|
| 3,400,447 A * | 9/1968 | Woods, Jr. et al. | | 29/467 |
| 3,747,466 A | 7/1973 | Rosman | | |
| 3,747,467 A | 7/1973 | Rosman | | |
| 4,051,592 A * | 10/1977 | Briles | | 29/509 |
| 4,159,666 A * | 7/1979 | Briles | | 411/507 |
| 4,352,324 A | 10/1982 | Noh | | |
| 4,413,767 A | 11/1983 | Hellinger et al. | | |
| 5,273,386 A * | 12/1993 | Luhm | | 411/507 |
| 6,237,471 B1 | 5/2001 | Nam | | |
| 6,527,490 B1 * | 3/2003 | Donhauser | | 411/455 |
| 6,920,820 B2 * | 7/2005 | Meggison et al. | | 99/422 |
| 2006/0185662 A1 * | 8/2006 | Kim | | 126/390.1 |
| 2007/0084038 A1 | 4/2007 | Chochet | | |
| 2008/0308561 A1 * | 12/2008 | Cheng et al. | | 220/573.2 |
| 2009/0114662 A1 * | 5/2009 | Coyne et al. | | 220/769 |

FOREIGN PATENT DOCUMENTS

| | | |
|---|---|---|
| GB | 1185196 A | 3/1970 |
| GB | 1185196 B | 3/1970 |
| JP | 2001-231695 A | 8/2001 |

* cited by examiner

*Primary Examiner* — Essama Omgba
(74) *Attorney, Agent, or Firm* — Edward S. Sherman

(57) ABSTRACT

An article of cookware is assembled by the rivet attachment of a handle. The rivets are simultaneously attached to both the cookware vessel and the handle. The co-aligned holes for receiving the rivet in the wall of the cooking vessel and the handle flange are bevel such that exterior of the rivet is relatively flush with the interior of the cookware article and the exterior of the handle flange. Deformation of the rivet head also deforms the beveled edges of the through hole in the cookware article, locking it with the corresponding portion of the handle flange through hole.

32 Claims, 1 Drawing Sheet

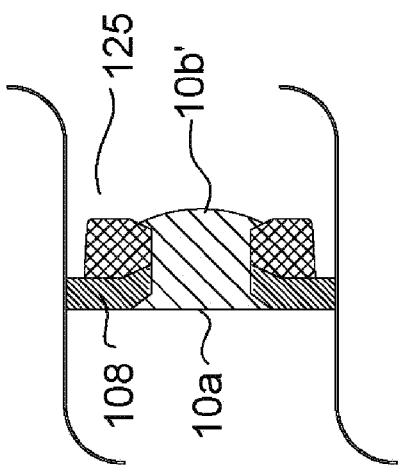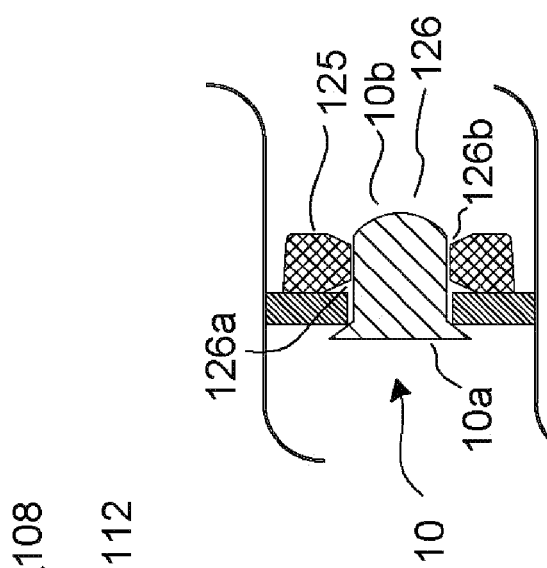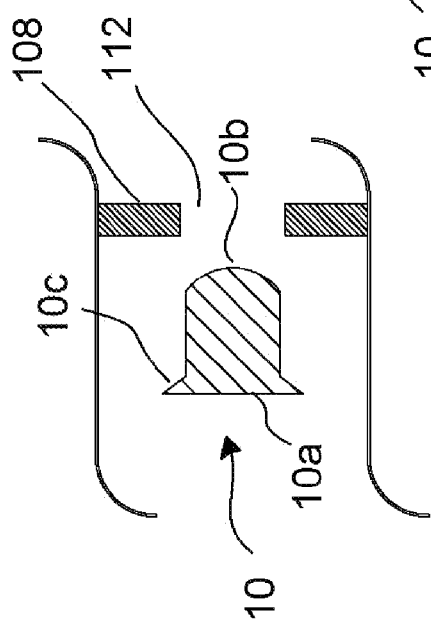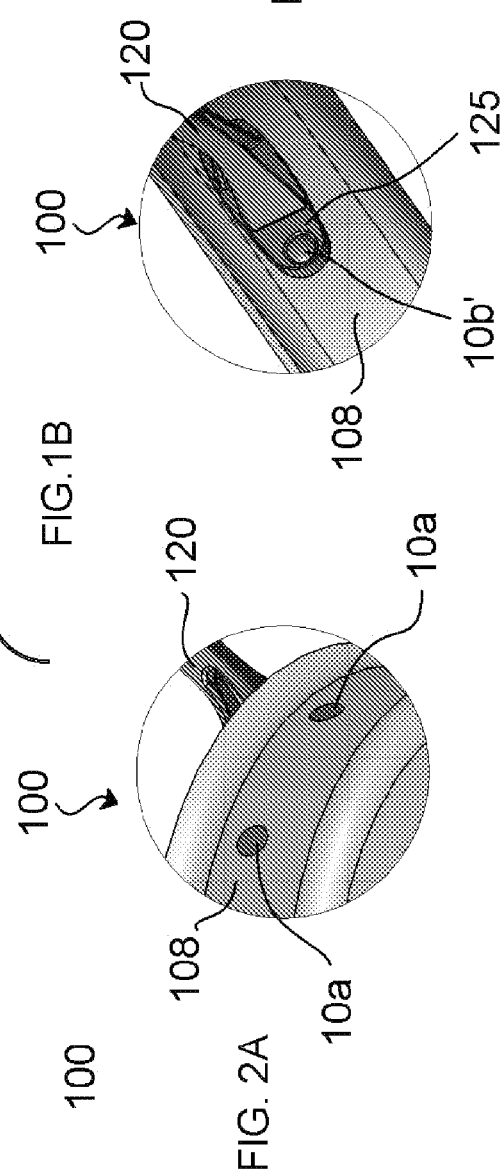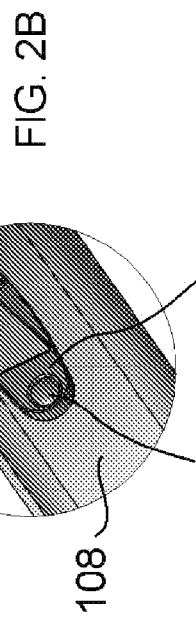

COOKWARE ARTICLE WITH SUBSTANTIALLY FLUSH RIVETS

CROSS REFERENCE TO RELATED APPLICATIONS

None

BACKGROUND OF INVENTION

The present invention relates to cookware vessels, in particular to cookware vessels having rivet attached handles.

Cookware vessels, such as pots pans and the like require handles so that they can be moved and manipulated by the cook. While such cookware vessels can be fabricated out of glass, ceramic material, and glass ceramics and porcelain coated metal, the preferred materials of construction for the greatest versatility are metals. Likewise it is desirable that the handle is also metallic, or at least has the principle structural component or the flange portion that is connected directly to the cooking vessel is formed of metal. While it is possible to form a cookware vessel with an integral handle by drawing and deforming a pliable metal sheet, the more common method is to first form the fluid containing cooking vessel and to then attach the handle. This allows for the handle to be constructed from a wider variety of shapes, as well as the use of multiple and different materials than the cookware vessel itself. As the handle must support the weight of the cookware vessel and the contents, which can be considerable if it is full of liquid, the bond between the handle and the cooking vessel must be strong and durable. While it is possible to weld a handle onto the outside of the cookware vessel, attachment with multiple rivets is the preferred assembly method as this process can be highly automated and produces a uniformly consistent aesthetic appearance in each product produced. While rivets can be avoided in some instances by spot welding a handle to the side wall of a cooking vessel, it then becomes desirable to use a multiple component handle to cover the spot weld location on the outside of the pan. Thus, frequently for light weight thin aluminum cookware a separate handle is attached by one or more screws to a flange that is spot welded to the outside of the cooking vessel wall. The handle will frequently have a canopy that extends over the sport welded flange, thus covering up the welding marks. Such screwed on handles have a less durable appearance, with the potential for the screws to loosen with abuse and poor attention to maintenance.

Although rivet connected handles are ideally suited for heavier duty cookware, in part because they convey the impression of durability to the consumer, they do have a number of drawbacks. The major drawback to rivets is that the rivet heads protrude into the interior of the cooking vessel. Though many consumers have grown accustomed to this appearance, the inward extending portion of the rivet can be more difficult to clean as for example when the inside of the cookware has a fluoropolymer non-stick coating and the rivets do not. In addition, debris can accumulate and char at the margin between the rivet and the interior cooking vessel surface, requiring extra care and more frequent attention by the consumer or professional cook in cleaning.

Accordingly, it is one object of the invention to provide a durable means for attaching cookware handle to the sides and lids of cookware, having the strength of rivets, yet that is aesthetically improved with at least a minimized appearance of the rivets.

It is a further object of the invention to provide cookware that is easier to clean as well as more sanitary.

SUMMARY OF INVENTION

In the present invention, the first object is achieved by the method of first providing a fluid containing vessel, then forming beveled holes in the sidewall of the fluid containing vessel and providing rivets having a tapered head narrowing to a substantially cylindrical shank portion. The cookware vessel is then attached to the flange portion of a cookware handle having a matching pattern of holes that are beveled at least on the side in contact with the cookware vessel. The shank portion of the rivets are then inserted into the holes formed in the sidewall of the fluid containing vessel from the interior of the vessel such that the shank portion will extend through the holes in the flange portion. Thereafter, each such rivet is impacted so as to deform the portion of the sidewall under the tapered rivet head such that it flows into the bevel around the flange hole thereby mechanically interlocking the rivet and the sidewall of the cooking vessel.

Moreover, it is preferable that the holes in the flange are beveled on both sides such that the shank portion of the rivets that extend through the holes of the flange when deformed mushroom outward to file the bevel edge about holes in the flange thereby locking the handle to the cookware vessel while maintaining a low exterior profile.

Another object of the invention is preferably achieved by utilizing the above process with an aluminum cooking vessel and steel rivets with a steel cookware handle.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a cross-sectional elevation of a rivet prior to being inserted into the hole in the sidewall of the cooking vessel.

FIG. 1B is a cross-sectional elevation of the rivet with the handle flange inserted thereon prior to final attachment.

FIG. 1C is a cross-sectional elevation through the rivet and handle flange after final attachment of the handle to the sidewall of the cooking vessel, FIG. 2A is a perspective view of the rivet in FIG. 1C from the inside of the cooking vessel FIG. 2B is a perspective view of the rivet of FIG. 1C from the outside or handle flange portion of the cooking vessel.

DETAILED DESCRIPTION

Referring to FIGS. 1-2, wherein like reference numerals refer to like components in the various views, there is illustrated therein a new and improved cookware vessel with flush rivet system, generally denominated 100 herein.

In accordance with a first embodiment of the present invention a cookware vessel 100, of which the relevant portions are shown in FIG. 2, comprises a handle 120 with a flange portion 125 attached to sidewall 108. The cookware vessel 100 comprises a fluid containing a portion 110 having a bottom 105 and substantially upright surrounding sidewalls 108. The handle 120 is attached to the cookware vessel with non-protruding rivets 10 via flange 125. Rivets 10 penetrate through the co-aligned holes 112 and 126 that are formed in the sidewall 108 and handle flange 125 respectively. The rivets 10 do not protrude into the interior of the cookware vessel, being substantially flush with the interior sidewall 108

FIG. 1A illustrates the construction of rivet 10 and holes in the sidewall of the cooking vessel prior to assembly and attachment to the flange of the handle. As shown in FIG. 1A initially cookware vessel 100 has a sidewall 108 with preferably a plurality of flush or straight sided through holes 112 for receiving a plurality of rivets 10. Rivet 10 has a wide head portion 10a with a conically tapering downward shoulder 10c to a cylindrical shank portion terminating at end 10b.

FIG. 1B shows the assembly of the rivet 10 with the sidewall hole and passing through aligned holes in the handle flange prior to deformation of the rivet 10 shown in FIG. 1C. First it should be noted that the flange holes 126 in this preferred embodiment have a double sided bevel, regions 126a and 126b The rivet 10 is first inserted via end 10b into the hole 112 from the inside of the inside of cookware vessel such that side 10a faces the inner fluid containing portion. The shank portion of the rivet ending at 10b extends past the hole 112 in sidewall 108, through the hole 126 in flange 125.

In the step shown in FIG. 1C, rivet 10 has been inserted in flush sided hole 112 and rapidly compressed or impact bonded from both sides such that inward facing surface of rivet head 10a become flush with the inner cooking surface on wall 108. In response to this impact, the rivet shank at end 10b mushrooms to fill the outer bevel in the sidewall. In contrast, the portion of the sidewall of the cookware vessel adjacent the head 10a of rivet 10 is depressed inward by the shoulders of the rivets head to fill the inner bevel in the flange such that handle and fluid containing portion 110 of the cookware article 100 are firmly attached and coupled together. Further, the that inward facing surface of rivet head 10a is now flush with the inner sidewall of the cookware vessel 110.

Moreover, it should be understood that it is preferable but not essential that the holes 126 in the flange 125 are also beveled on both sides such that the shank portion 10b of the rivets 10 that extend through the holes 126 of the flange 125 when deformed mushroom outward to file the beveled edge 126b thereby locking the handle to the cookware vessel while maintaining a low exterior profile.

Preferably a non-stick organic coating, such as a fluoropolymer coating, is applied over the interior of the cooking vessel 110, such that both the rivet surface 10a and the fluid containing portion of cooking vessel 110 are easier to clean, as well as have a small uniform appearance with any gap at their common interface being sealed. In contrast to steel rivets or rivets added after the fluoropolymer coating, the resulting cookware article 100 will be easier to clean and maintain.

In another embodiment of the invention, in an additional step the entire interior surface of the cookware article may be spray coated with molten aluminum to provide a roughed surface to aid in the adhesion of the fluoropolymer coating.

The cookware vessel is optionally aluminum, copper, stainless steel, clad stainless steel. However, the rivet 10 is preferably harder than the material that forms the fluid containing portion 110 of the cookware vessel 100, thus when the fluid containing portion 110 is aluminum or copper it is preferable to use a steel rivet.

The handle 120 is also optionally aluminum, copper but is preferably stainless steel. Further, the flange 125 portion of the handle 120 is also preferably harder than the material that forms the fluid containing portion 110 of the cookware vessel 100, or the cookware vessel wall is relatively thin as compared with the thickness of the flange 120 to provide for the desired deformation of the vessel wall into the bevel 126a in the flange 125.

The fluid containing portion 110 of the cookware vessel 100 may comprise one or more layers of a relatively ductile metal with relatively high thermal conductivity, such as aluminum or copper. More preferably these aluminum and/or copper layers are further covered by at least an inner or outer stainless steel cladding layer and most preferably by both an inner and outer stainless steel cladding layer. Alternatively, the fluid containing portion 110 of the cookware vessel 100 may be formed of anodized aluminum.

When the rivets 10 and the fluid containing portion 110 of the cookware vessel 100 are different materials it may be preferable to cover the interior cooking surface with one or more layers of materials, such as thermally sprayed aluminum or one or more layers of fluoropolymer non-stick coating. Further, as the thermally sprayed aluminum coating provides a rough surface that will aid in the adhesion of the fluoropolymer non-stick coating, it is preferable to apply the fluoropolymer non-stick coating on the thermally sprayed aluminum coating.

Alternatively, the fluoropolymer non-stick coating may be applied over anodized aluminum. Alternatively, provided the rivet head is roughed or has an additional surface treatment to aid in the adhesion of the fluoropolymer non-stick coating layer or layers, the interior of the cookware vessel need not be pre-treated prior to the application of one or more layers of a fluoropolymer non-stick coating.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A process for attaching a handle to an article of cookware,
   a) providing a cooking vessel with at least one flush hole for the attachment of a handle,
   b) providing a cookware handle having a flange portion with one or more rivet receiving holes, said one or more holes each being beveled from at least an inside portion configured to contact an exterior surface of a wall of the cooking vessel,
   c) disposing the flange of the cookware handle on the exterior surface of the wall of the cooking vessel with the at least one flush hole in the cooking vessel aligned with the one or more rivet receiving holes in the flange,
   d) inserting at least one rivet having a head and a shaft portion into each of the aligned holes with the shaft portion passing first through the cookware vessel adjacent the beveled portion and then through the handle flange portion,
   e) simultaneously deforming the shaft and head portion of said at least one rivet wherein the head of the rivet drives a portion of the wall of the cookware vessel into the beveled portion of the handle flange.

2. A process for attaching a handle to an article of cookware according to claim 1 wherein the shank portion of said at least one rivet mushrooms outward.

3. A process for attaching a handle to an article of cookware according to claim 1 wherein the at least one flange hole has a double sided bevel.

4. A process for attaching a handle to an article of cookware according to claim 3 wherein the shaft portion of said at least one rivet mushrooms outward to fill the exterior bevel on the flange.

5. A process for attaching a handle to an article of cookware according to claim 3 wherein said at least one rivet is formed of a material that is harder than the material that forms the cookware vessel wall.

6. A process for attaching a handle to an article of cookware according to claim 3 wherein the flange is harder than said at least one rivet.

7. A process for attaching a handle to an article of cookware according to claim 1 wherein the flange is formed of a material that is harder than the material that forms the cookware vessel wall.

8. A process for attaching a handle to an article of cookware according to claim 1 wherein said at least one rivet is formed of a material that is harder than the material that forms the cookware vessel wall.

9. A process for attaching a handle to an article of cookware according to claim 1 wherein the flange is harder than the rivet.

10. A process for attaching a handle to an article of cookware according to claim 1 wherein the cookware vessel wall is formed of aluminum and the flange and said at least one rivet are steel.

11. A process for attaching a handle to an article of cookware according to claim 1 further comprising the step of aluminum spray coating the interior of the cookware vessel after said step of simultaneously deforming the shaft and head portions of the rivets.

12. A process for attaching a handle to an article of cookware according to claim 11 further comprising the step of depositing one or more layers of a fluoropolymer non-stick coating onto the sprayed aluminum coating.

13. A process for attaching a handle to an article of cookware according to claim 1 wherein the cookware vessel wall is formed of anodized aluminum.

14. A process for attaching a handle to an article of cookware according to claim 13 further comprising the step of depositing one or more layers of a fluoropolymer non-stick coating onto the anodized aluminum that forms at least one of the interior and exterior surfaces of the wall of the cookware vessel.

15. A process for attaching a handle to an article of cookware according to claim 1 wherein the at least one rivet is harder than the cookware vessel.

16. A process for attaching a handle to an article of cookware according to claim 1 wherein the cookware vessel wall is formed of one or more metal selected from the group consisting of aluminum, copper, stainless steel and clad stainless steel.

17. A process for attaching a handle to an article of cookware according to claim 1 wherein the cookware vessel wall is formed of aluminum and the flange and rivets are steel.

18. An article of cookware that comprises:
a) a cookware vessel having a bottom portion and substantially upright and curved surrounding sidewalls,
b) a handle attached to the substantially upright surrounding sidewalls of said fluid containing vessel, the handle having a flange portion that wraps around at least a portion of the sidewalls,
c) rivets extending through two or more holes in the substantially upright sidewalls into corresponding beveled holes in an adjacent flange portion of the handle, the holes being beveled from an inside portion of the flange portion configured to contact an exterior surface of a wall of the cooking vessel, said rivets having head portions that conform with the curvature of the sidewalls of the interior of the cookware vessel wherein a portion of the wall of the cookware vessel is deformed under the head of said rivets to fill the bevel portion surrounding each hole in the flange.

19. An article of cookware according to claim 18 wherein the rivets are formed of steel and the cookware vessel is formed of at least one of at least one layer of a metal selected from the group consisting of aluminum and copper.

20. An article of cookware according to claim 19 wherein the at least one layer of metal is surrounded by an inner and outer cladding layer of stainless steel.

21. An article of cookware according to claim 18 wherein at least the entire interior surface of the cookware vessel comprises a non-stick coating.

22. A process for attaching a handle to an article of cookware,
a) providing a cooking vessel with at least one hole for the attachment of a handle,
b) providing a cookware handle having a flange portion with one or more rivet receiving holes, said one or more holes each being beveled from at least an inside portion configured to contact an exterior surface of a wall of the cooking vessel,
c) disposing the flange of the cookware handle on the exterior surface of the wall of the cooking vessel with the at least one hole in the cooking vessel aligned with the one or more rivet receiving holes in the flange,
d) inserting at least one rivet having a head and a shaft portion with at least one co-aligned hole with the shaft portion passing first through the cookware vessel adjacent the beveled portion and then through the handle flange portion,
e) impacting at least one of the head and shaft portion of the rivet to deform the shaft portion of the rivet wherein the head of the rivet drives a portion of the wall of the cookware vessel into the beveled portion of the handle flange.

23. A process for attaching a handle to an article of cookware according to claim 22 wherein the shank portion of said at least one rivet mushrooms outward.

24. A process for attaching a handle to an article of cookware according to claim 22 wherein the flange holes have a double sided bevel.

25. A process for attaching a handle to an article of cookware according to claim 24 wherein the shaft portion of said at least one rivet mushrooms outward to fill the exterior bevel on the flange.

26. A process for attaching a handle to an article of cookware according to claim 24 wherein said at least one rivet is formed of a material that is harder than the material that forms the cookware vessel wall.

27. A process for attaching a handle to an article of cookware according to claim 24 wherein the flange is harder than said at least one rivet.

28. A process for attaching a handle to an article of cookware according to claim 22 wherein the flange is formed of a material that is harder than the material that forms the cookware vessel wall.

29. A process for attaching a handle to an article of cookware according to claim 22 wherein said at least one rivet is formed of a material that is harder than the material that forms the cookware vessel wall.

30. A process for attaching a handle to an article of cookware according to claim 22 wherein the flange is harder than said at least one rivet.

31. A process for attaching a handle to an article of cookware according to claim 22 further comprising the step of aluminum spray coating the interior of the cookware vessel after said step of simultaneously deforming the shaft and head portions of said at least one rivet.

32. A process for attaching a handle to an article of cookware according to claim 31 further comprising the step of depositing one or more layers of a fluoropolymer non-stick coating onto the sprayed aluminum coating.

* * * * *